United States Patent
Ohishi et al.

(10) Patent No.: US 8,591,757 B2
(45) Date of Patent: Nov. 26, 2013

(54) ELECTROLYTE COMPOSITION AND IONIC LIQUID

(75) Inventors: Takahiro Ohishi, Settsu (JP); Akiko Tsujimoto, Settsu (JP); Hiroyuki Ogino, Settsu (JP); Kazuyuki Tateishi, Settsu (JP); Mutsuaki Murakami, Settsu (JP)

(73) Assignee: Kaneka Corporation, Osaka (JP)

( * ) Notice: Subject to any disclaimer, the term of this patent is extended or adjusted under 35 U.S.C. 154(b) by 461 days.

(21) Appl. No.: 12/675,888

(22) PCT Filed: Sep. 1, 2008

(86) PCT No.: PCT/JP2008/065647
§ 371 (c)(1),
(2), (4) Date: Mar. 1, 2010

(87) PCT Pub. No.: WO2009/031490
PCT Pub. Date: Mar. 12, 2009

(65) Prior Publication Data
US 2010/0213402 A1    Aug. 26, 2010

(30) Foreign Application Priority Data

Sep. 3, 2007 (JP) ................................. 2007-227552
Aug. 12, 2008 (JP) ................................. 2008-208056

(51) Int. Cl.
*H01G 9/022* (2006.01)
(52) U.S. Cl.
USPC ........................................................ 252/62.2
(58) Field of Classification Search
USPC ........................................................ 252/62.2
See application file for complete search history.

(56) References Cited

U.S. PATENT DOCUMENTS

| | | | |
|---|---|---|---|
| 5,205,965 A | 4/1993 | Uetani et al. | |
| 2006/0121285 A1* | 6/2006 | Nakayama et al. | 428/411.1 |
| 2006/0181835 A1* | 8/2006 | Murakami et al. | 361/503 |
| 2007/0263341 A1 | 11/2007 | Tsukada et al. | |
| 2008/0304208 A1 | 12/2008 | Murakami et al. | |

FOREIGN PATENT DOCUMENTS

| | | | |
|---|---|---|---|
| JP | 2003-022938 | * | 1/2003 |
| JP | 2007-080895 | | 3/2007 |
| JP | 2007-106849 | | 4/2007 |
| WO | WO 2006/088033 | | 8/2006 |

OTHER PUBLICATIONS

International Search Report for PCT/JP2008/065647, mailed Dec. 2, 2008.
English translation of the International Preliminary Report on Patentability (Chapter 1) of PCT Application No. PCT/JP2008/065647.

* cited by examiner

*Primary Examiner* — Carol M Koslow
(74) *Attorney, Agent, or Firm* — Nixon & Vanderhye PC

(57) ABSTRACT

Conventionally, an electrolyte composition made from a conductive polymer and an ionic liquid possibly has poor durability (particularly impedance characteristics) in a case where the electrolyte composition is used in a conductive polymer capacitor. The present invention provides an electrolyte composition having excellent durability, by using an ionic liquid that includes carboxylic acid as its anion component. Moreover, the carboxylic acid is preferably one which includes a hydroxyl group, or is preferably an amino acid. Moreover, the electrolyte composition is preferably made of (A) a polymer component of a conductive polymer and (B) an ionic liquid. Moreover, the electrolyte composition preferably includes an ammonium salt, an amine salt, a quaternary ammonium salt or like salts.

14 Claims, 1 Drawing Sheet

US 8,591,757 B2

ELECTROLYTE COMPOSITION AND IONIC LIQUID

This application is the U.S. national phase of International Application No. PCT/JP2008/065647 filed 1 Sep. 2008, which designated the U.S. and claims priority to Japan Application Nos. 2007-227552 filed 3 Sep. 2007, and 2008-208056 filed 12 Aug. 2008, the entire contents of each of which are hereby incorporated by reference.

TECHNICAL FIELD

The present invention relates to (i) a novel electrolyte composition which uses a monomer component of a conductive polymer and an ionic liquid, (ii) a method for producing such a composition, and (iii) an ionic liquid.

BACKGROUND ART

Electrolytic capacitors that use conductive polymers as electrolytes are gaining increased shares in the markets due to their excellent impedance characteristics.

The electrolytic capacitors typically use conductive polymers such as solid polypyrrole or polythiophene derivatives as the electrolytes. The conductive polymers allow the electrolytic capacitors that use those conductive polymers to have a remarkably higher electric conductivity (i.e., electron conductivity) than the electrolytic capacitors that use regular liquid as the electrolytes. Therefore, with the capacitors that use the conductive polymers as the electrolytes, it is possible to reduce internal impedance. Thus, such an electrolytic capacitor particularly exhibits excellent characteristics as a high-frequency circuit capacitor. However, with either of the conductive polymer capacitors, the conductive polymers substantially do not have ionic conductivity. Hence, recoverability (i.e. anodization) of dielectric oxide film of the capacitor compare unfavorably with a conventional capacitor that uses an electrolytic solution. As a result, there is a disadvantage with the electrolytic capacitors that it is not possible to form a capacitor with a high withstand voltage. More specifically, usually with an electrolytic capacitor using aluminum as its anode, in a case where for example 40V formation is carried out, a withstand voltage that is actually being used is around 16 V, and with an electrolytic capacitor using tantalum as its anode, in a case where for example 24V formation is carried out, the voltage that is actually being used is around 12 V. Here, the 40 V formation means that a direct voltage applied at a time when a dielectric oxide film is formed on a valve metal surface is 40 V. This ideally obtains a capacitor having a withstand voltage of 40V. In theory, an increase of the formation voltage causes an increase in the withstand voltage in actual use. However in this case, as the formation voltage is made higher, the capacitance decreases, and further even if the formation voltage is increased, the withstand voltage in actual use does not increase in proportion to the formation voltage. In order to solve this problem, the inventors of the present invention already have developed an electrolyte made of an ionic liquid and a conductive polymer (Patent Literatures 1 to 3). The electrolyte was accomplished by finding that an ionic liquid has an excellent anodic oxidation effect of a valve metal, allowing repairing of for example a defect in an aluminum oxide film. By this invention, an electrolytic capacitor with a high withstand voltage was realized.
However, the inventors newly found after further thorough studies on that invention that when a conventional ionic liquid was used, the impedance characteristics easily decrease. In other words, there were cases where the durability of the capacitor was insufficient. Furthermore, the studies by the inventors also resulted in finding that since the conventional ionic liquid has insufficient anodization ability, corrosion and defect of the oxide film is not repairable in time. This ultimately results in breakage of the oxide film, which breakage causes shortage of the electrolytic capacitor. That is to say, it was found that with the electrolyte made of the ionic liquid and conductive polymer, maintaining good durability was one large problem.

CITATION LIST

Patent Literature 1
International Patent Application Publication No. WO 2005/012599
Patent Literature 2
International Patent Application Publication No. WO 2005/051897
Patent Literature 3
International Patent Application Publication No. WO 2006/088033

SUMMARY OF INVENTION

Technical Problem

The present invention is accomplished in order to solve the newly found foregoing problems. An object of the present invention is to provide a conductive polymer electrolyte having a high withstand voltage (preferably at least 70% of a formation voltage), without causing a decrease in impedance characteristics over time.

Solution to Problem

As a result of diligent study in view of the foregoing problems, the inventors of the present invention found out that a conductive polymer electrolyte made of a composition including (i) a monomer component of a conductive polymer and (ii) at least one type of ionic liquid selected from the group of ionic liquids including a specific anion component has excellent durability that is conventionally unattainable, and thus attained the present invention. In this case, a degree of corrosion of an oxide film is reduced as compared to a conventional ionic liquid. Furthermore, the inventors of the present invention newly found that an ionic liquid including a carboxylic acid anion has high anodization ability. By this finding, the present invention was attained.

Namely, the present invention includes the following [1] to [19]:

[1] An electrolyte composition including: a monomer component of a conductive polymer; and at least one of (i) an ionic liquid including a formate anion, and/or (ii) an ionic liquid including an anion represented by the following general formula (1):

Chem. 9

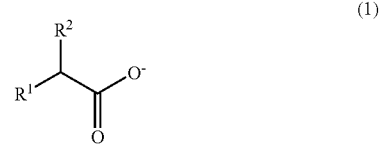

(1)

wherein $R^1$ and $R^2$ independently denote: a hydrogen atom, a protected or nonprotected hydroxyl group, a protected or nonprotected amino group, an alkoxy group, a nitro group, a cyano group, a carboxyl group, a halogen atom, a linear, branched, cyclic or acyclic, substituted or unsubstituted $C_1$ to $C_{20}$ alkyl group, a linear, branched, cyclic or acyclic, substituted or unsubstituted $C_2$ to $C_{20}$ alkenyl group, a linear, branched, cyclic or acyclic, substituted or unsubstituted $C_2$ to $C_{20}$ alkynyl group, a substituted or unsubstituted $C_6$ to $C_{20}$ aryl group, a substituted or unsubstituted $C_4$ to $C_{20}$ heteroaryl group, a substituted or unsubstituted $C_7$ to $C_{20}$ aralkyl group, or a substituted or unsubstituted $C_4$ to $C_{20}$ heteroaralkyl group; the $R^1$ and $R^2$ being identical to or different from each other, and together being cyclic or acyclic.

[2] The electrolyte composition according to [1], in which in the general formula (1), at least one of the $R^1$ and $R^2$ is a protected or nonprotected hydroxyl group.

[3] The electrolyte composition according to [1] or [2], in which in the general formula (1), at least one of the $R^1$ and $R^2$ is a linear, branched, cyclic or acyclic, substituted or unsubstituted $C_1$ to $C_{20}$ alkyl group or a substituted or unsubstituted $C_6$ to $C_{20}$ aryl group.

[4] The electrolyte composition according to any one of [1] to [3], in which in the general formula (1), one of the $R^1$ and $R^2$ is a protected or nonprotected hydroxyl group, and the other one of the $R^1$ and $R^2$ is a linear, branched, cyclic or acyclic, substituted or unsubstituted $C_1$ to $C_{20}$ alkyl group or a substituted or unsubstituted $C_6$ to $C_{20}$ aryl group.

[5] The electrolyte composition according to [1], in which includes the ionic liquid whose anion component is an amino acid or an amino acid derivative; and a conductive polymer.

[6] The electrolyte composition according to [1] or [5], in which an anion component is an amino acid represented by a general formula (2).

[7] The electrolyte composition according to [6], in which the anion component is selected from the group consisting of: glycine, phenylglycine, alanine, valine, leucine, isoleucine, serine, threonine, cysteine, cystine, methionine, phenylalanine, tyrosine, tryptophan, histidine, lysine, arginine, aspartic acid, asparagine, glutamic acid, glutamine, ornithine, and their derivatives.

[8] The electrolyte composition according to [5], in which the anion component is an amino acid represented by a general formula (3) or a general formula (4).

[9] The electrolyte composition according to [8], in which the anion component is selected from the group consisting of: proline, pipecolic acid, nipecotic acid, and their derivatives.

[10] The electrolyte composition according to any one of [1] to [9], in which the ionic liquid has an ability to form, by anodization, an oxide film on a valve metal surface.

[11] The electrolyte composition according to any one of [1] to [10], in which a cation component of the ionic liquid is selected from the group consisting of: ammonium ions, imidazolinium ions, pyridinium ions, pyrrolidinium ions, pyrrolinium ions, pyrazinium ions, pyrimidinium ions, triazonium ions, triazinium ions, triazine ions, quinolinium ions, isoquinolinium ions, indolinium ions, quinoxalinium ions, piperazinium ions, oxazolinium ions, thiazolinium ions, morpholinium ions, piperazine ions, and their derivatives.

[12] The electrolyte composition according to any one of [1] to [11], in which a monomer that constructs a conductive polymer includes at least one or two or more compounds selected from the group consisting of: pyrrole, aniline, thiophene, and their derivatives.

[13] The electrolyte composition according to any one of [1] to [12], further including: at least one substance selected from the group consisting of: ammonium salts, amine salts, quaternary ammonium salts, tertiary amines and organic acids, imidazolium salts, and amidine salts, the at least one substance being added to the ionic liquid.

[14] The electrolyte composition according to any one of [1] to [13], in which (i) the ionic liquid including a formate anion and/or (ii) the ionic liquid including an anion represented by the general formula (1) being included by an amount of not less than 0.01 molar equivalent but not more than 0.5 molar equivalent, with respect to the conductive high-molecular monomer.

[15] The electrolyte composition according to [13], in which the at least one substance selected from the group consisting of: ammonium salts, amine salts, quaternary ammonium salts, tertiary amines and organic acids, imidazolium salts, and amidine salts is included in the ionic liquid in a range of not less than 1 wt % but not more than 50 wt %, with respect to the ionic liquid.

[16] An ionic liquid represented by the following general formula (5):

Chem. 10

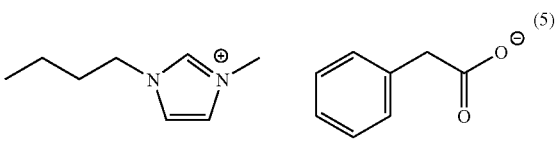

(5)

[17] An ionic liquid represented by the following general formula (6):

Chem. 11

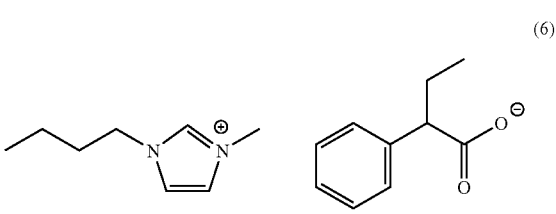

(6)

[18] An ionic liquid represented by the following general formula (7):

Chem. 12

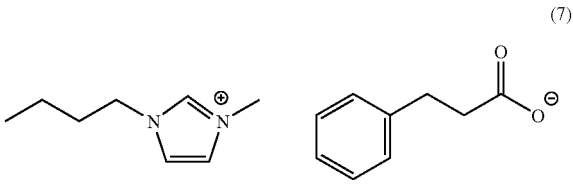

(7)

[19] An ionic liquid represented by the following general formula (8):

Chem. 13

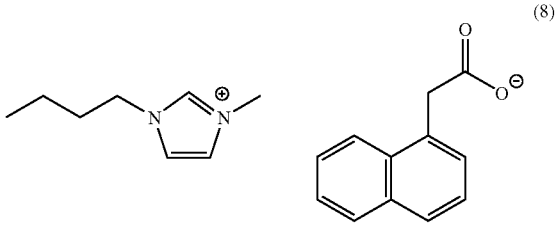

(8)

The ionic liquids represented by the formulas (5) to (8) are novel ionic liquids that were found by the inventors of the present invention, to have excellent anodization abilities.

Advantageous Effects of Invention

Use of (a) an electrolyte composition made of a monomer of a conductive polymer and an ionic liquid including a specific anion component or (b) an electrolyte composition made of (i) a monomer of a conductive polymer, (ii) an ionic liquid including a specific anion component and (iii) a specific salt, allows obtaining a conductive polymer electrolyte which has excellent durability and anodization ability.

DESCRIPTION OF EMBODIMENTS

Figure 1:
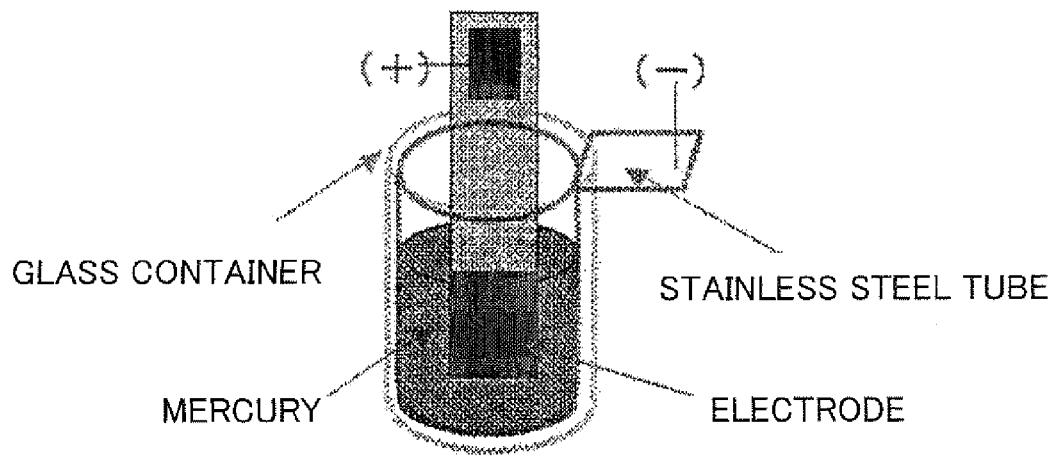
FIG. 1 illustrates a mercury cell used for impedance measurement.

An embodiment of the present invention is specifically described below.
First described is a monomer component of a conductive polymer used in the present invention. A monomer component of a conductive polymer is a monomer that is formable as a conductive polymer, by carrying out polymerization thereto. Examples of the monomer used in the present invention include, but are not limited to, thiophene and its derivative, pyrrole and its derivative, and aniline and its derivative. Examples of the thiophene derivative encompass: 3,4-ethylenedioxythiophene, 3-alkylthiophene (alkyl group can be a methyl group, ethyl group, propyl group, butyl group, pentyl group, hexyl group, octyl group, dodecyl group, etc.), fluorophenyl thiophene, allylthiophene, 3-methoxythiophene, 3-chlorothiophene, and 3-acetylthiophene. Examples of the pyrrole derivative encompass 3-methylpyrrole and 1-(dimethylamino)pyrrole. Examples of the aniline derivative encompass: o-toluidine, m-toluidine, 1,3-benzenediamine, 1,2-benzenediamine, 2-aminophenol, 3-aminophenol, 2-fluoroaniline, 3-fluoroaniline, 2-ethynylaniline, 3-ethynylaniline, 2-aminobenzonitrile, 3-aminobenzonitrile, 3-vinylaniline, 2,3-dimethylaniline, 3,5-dimethylaniline, 2,5-dimethylaniline, 2-(aminomethyl)aniline, 4-methyl-1,2-benzenediamine, 2-methyl-1,3-benzenediamine, 3-methoxyaniline, 2,3-diaminophenol, 5-fluoro-2-methylaniline, 2-fluoro-5-methylaniline, 3-fluoro-2-methylaniline, and 2-chloroaniline. Since the polymer has high conductivity and is stable in air, the polymer is preferably poly(3,4-ethylenedioxythiophene) or polypyrrole; poly(3,4-ethylenedioxythiophene) is particularly preferable in view of conductivity and thermal resistance. Moreover, the present invention includes a polymer made of two or more of the monomers.
The next description explains the ionic liquid used in the present invention. The ionic liquid is also called an ambient temperature molten salt, and denotes a molten salt that is of a liquid form at ambient temperature even though the liquid is made of only ions. The ionic liquid is made of a combination of (i) cations such as imidazolinium and (ii) anions appropriate to the cations. The ionic liquid is thought to be made of only ions and ionized by 100%, not partially ionized/dissociated as with usual organic solvents. As described above, the ionic liquid denotes an ionic liquid that is of a liquid form at ambient temperature, however the ionic liquid used in the present invention does not necessarily need to be in the liquid form at ambient temperature as long as the ionic liquid is in a liquid form in an aging treatment or heat treatment of the capacitor, so that the ionic liquid spreads throughout the entire electrolyte, and also made into a liquid form at a time of dielectric oxide film repair, by generated Joule heat.
The present invention uses (i) an ionic liquid having a formic acid anion and/or (ii) an ionic liquid having an anion represented by the following general formula (1):

Chem. 14

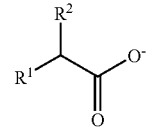

The following description explains the ionic liquid that includes the anion represented by the general formula (1). The anion represented by the general formula (1) is paired with a cation later described to form a liquid salt, i.e. an ionic liquid, at ambient temperature.
In the general formula (1), $R^1$ and $R^2$ may independently denote a hydrogen atom, a protected or nonprotected hydroxyl group, a protected or nonprotected amino group, an alkoxy group, a nitro group, a cyano group, a carboxyl group, a halogen atom, a linear, branched, cyclic or acyclic, substituted or unsubstituted $C_1$ to $C_{20}$ alkyl group, a linear, branched, cyclic or acyclic, substituted or unsubstituted $C_2$ to $C_{20}$ alkenyl group, a linear, branched, cyclic or acyclic, substituted or unsubstituted $C_2$ to $C_{20}$ alkynyl group, a substituted or unsubstituted $C_6$ to $C_{20}$ aryl group, a substituted or unsubstituted $C_4$ to $C_{20}$ heteroaryl group, a substituted or unsubstituted $C_7$ to $C_{20}$ aralkyl group, or a substituted or unsubstituted $C_4$ to $C_{20}$ heteroaralkyl group. The $R^1$ and $R^2$ may be identical to or different from each other, and together may be cyclic or acyclic.
The "substituted or unsubstituted" in the present invention denotes that an atom or group in the alkyl group or the like may be substituted with another atom or a substituent group. The "substituent group" is not particularly limited as long as the substituent group has no adverse effect on the reaction. More specifically, examples of the substituent group encompass: a hydroxyl group, an alkyl group, an alkoxy group, an alkylthio group, a nitro group, an amino group, a carboxyl group, and a halogen atom.
The $R^1$ and $R^2$ are further described. The linear, branched, cyclic or acyclic, substituted or unsubstituted $C_1$ to $C_{20}$ alkyl group is not particularly limited, and examples thereof encompass: a methyl group, a hydroxymethyl group, an ethyl group, a n-propyl group, an isopropyl group, a cyclopropyl group, an n-butyl group, a sec-butyl group, a tert-butyl group, a cyclobutyl group, a n-pentyl group, a cyclopentyl group, a n-hexyl group, a n-heptyl group, a cyclohexyl group, a n-octyl group, and a n-decyl group; and also includes a $C_1$ to $C_{20}$ alkyl group in which an arbitrary number of hydrogen atoms in the alkyl group are replaced with fluorine atoms. Examples of the linear, branched, cyclic or acyclic, substituted or unsubstituted $C_2$ to $C_{20}$ alkenyl group encompass: a vinyl group, a propenyl group, a styryl group, an isopropenyl group, a cyclopropenyl group, a butenyl group, a cyclobutenyl group, a cyclopentenyl group, a hexenyl group, and a cyclohexenyl group. Examples of the linear, branched, cyclic or acyclic, substituted or unsubstituted $C_2$ to $C_6$ alkynyl group encompass: an ethynyl group, a propynyl group, a phenylethynyl group, a cyclopropyl ethynyl group, a butynyl group, a pentynyl group, a cyclobutyl ethynyl group, and a hexynyl group. Examples of the substituted or unsubstituted aryl group encompass: a phenyl group, a naphthyl group, an anthryl group, a phenanthryl group, a terphenyl group, and a 3,4,5-trifluorophenyl group. Examples of the substituted or unsubstituted heteroaryl group encompass: a pyrrolinyl group, a pyridyl group, a quinolyl group, an imidazolyl group, a furyl group, an indolyl group, a thienyl group, an oxazolyl group, a thiazolyl group, a 2-phenylthiazolyl group, and a 2-anisylthiazolyl group. Examples of the substituted or unsubstituted aralkyl group encompass: a benzyl group, a chlorobenzyl group, a bromobenzyl group, a salicyl group, an α-hydroxybenzyl group, a phenethyl group, an α-hydroxyphenethyl group, a naphthyl methyl group, an anthracenylmethyl group, a 3,5-difluorobenzyl group, and a trityl group. Examples of the substituted or unsubstituted heteroaralkyl group encompass: a pyridylmethyl group, a difluoropyridylmethyl group, a quinolylmethyl group, an indolylmethyl group, a furfuryl group, and a thienylmethyl group. Alternatively, the $R^1$ and $R^2$ may together be cyclic or acyclic, and examples of the $R^1$ and $R^2$ being cyclic are a cyclohexyl group and a phenyl group. Moreover, in a case where the $R^1$ and/or $R^2$ is a hydroxyl group or includes a hydroxyl group as a substituent group, the hydroxyl group may or may not be protected. In a case where the hydroxyl group is protected, there is no particular limit to its protective group, and a general protective group is used. For example, a protective group disclosed in "PROTECTIVE GROUPS in ORGANIC SYNTHESIS THIRD EDITION" (page 17, WILEY-INTERSCIENCE) may be used. Examples of the protective group of the hydroxyl group encompass: ether-based protective groups such as a methyl group, a methoxymethyl group, a methylthiomethyl group, a trimethylsilyl group, and a triethylsilyl group; and ester-based protective groups such as an acetyl group and a chloroacetyl group.

Furthermore, in a case where the $R^1$ and/or $R^2$ is an amino group or includes an amino group as a substituent group, the amino group may or may not be protected. In a case where the amino group is protected, there is no particular limit to its protective group, and for example a general protective group is used. For example, a protective group disclosed in "PROTECTIVE GROUPS in ORGANIC SYSTHESIS THIRD EDITION" (page 494, WILEY-INTERSCIENCE) may be used. The protective group of the amino group is described more specifically in a latter description of $R^4$ in the general formula (1).

These ionic liquids may be used solely, or may be used in combination by mixing at least two of the ionic liquids in an arbitrary proportion. Moreover, if a molecule is asymmetric, the ionic liquid may be an optically active substance or may be a racemic body. In view of anodization ability and availability, it is preferable that at least one of the $R^1$ and $R^2$ is a hydrogen atom or a hydroxyl group, and the other one thereof is a methyl group, an ethyl group, a trifluoromethyl group, a phenyl group, a benzyl group, a naphthyl group or the like. In a case where at least one of the $R^1$ and $R^2$ is a hydroxyl group, the hydroxyl group may be or may not be protected. However, a nonprotected hydroxyl group generally demonstrates higher anodization ability, and therefore is more preferable. More specifically, it is particularly preferable that in the case where at least one of the $R^1$ and $R^2$ is a hydroxyl group, the other one thereof is a phenyl group, i.e. mandelic acid or its derivative. Moreover, another preferable example is that the $R^1$ and $R^2$ together form a cyclohexyl group or a phenyl group. The following description explains a case where the anion component of the ionic liquid is an amino acid. First described is an amino acid represented by the general formula (2):

Chem. 15

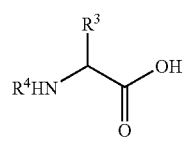

(2)

In the general formula (2), $R^3$ is a substituted or unsubstituted $C_1$ to $C_{20}$ alkyl group, a substituted or unsubstituted $C_6$ to $C_{20}$ aryl group, a substituted or unsubstituted $C_7$ to $C_{20}$ aralkyl group, or a hydrogen atom. The substituted or unsubstituted $C_1$ to $C_{20}$ alkyl group is not particularly limited, and examples thereof encompass: a methyl group, an ethyl group, a n-propyl group, an isopropyl group, a cyclopropyl group, a n-butyl group, an isobutyl group, a t-butyl group, a cyclobutyl group, a n-pentyl group, a cyclopentyl group, a n-hexyl group, a cyclohexyl group, a n-octyl group, a n-decyl group, a 3-methylpropyl group, a 2-methylpropyl group, a hydroxymethyl group, a 2-hydroxyethyl group, a mercaptomethyl group, an epithiomethyl group, a 1-methylthioethyl group, an indolylmethyl group, an imidazolylmethyl group, a 1-aminobutyl group, a 1-aminopropyl group, a 1-amidinoaminopropyl group, a carboxymethyl group, a carbamoylmethyl group, a 1-carboxyethyl group, and a 1-carbamoylethyl group. The substituted or unsubstituted $C_6$ to $C_{20}$ aryl group is not particularly limited, and examples thereof encompass: a phenyl group, a p-methylphenyl group, a p-methoxyphenyl group, a p-chlorophenyl group, and a naphthyl group. The substituted or unsubstituted $C_7$ to $C_{20}$ aralkyl group is not particularly limited, and examples thereof encompass: a benzyl group, a p-hydroxybenzyl group, a p-methoxybenzyl group, a p-nitrobenzyl group, an o-hydroxybenzyl group, an o-methoxybenzyl group, an o-nitrobenzyl group, a m-hydroxybenzyl group, a m-methoxybenzyl group, a m-nitrobenzyl group, a 1-phenethyl group, and a 2-phenethyl group. Among these amino acids, in view of availability and that an ionic liquid having a relatively low Tg is easily obtainable, the amino acid is preferably glycine, phenylglycine, alanine, valine, leucine, isoleucine, serine, threonine, cysteine, cystine, methionine, phenylalanine, tyrosine, tryptophan, histidine, lysine, arginine, aspartic acid, asparagine, glutamic acid, glutamine, or ornithine.

In the general formula (1), $R^4$ represents a protective group of a hydrogen atom or an amino acid. Specific examples of the protective group of an amino acid encompass: a benzyl group, a trityl group, a formyl group, an acetyl group, a chloroacetyl group, a tetrachloroacetyl group, a tetrafluoroacetyl group, a benzoyl group, a phenylacetoxy group, a methoxycarbonyl group, an ethoxycarbonyl group, a 9-fluorenylmethoxycarbonyl group, and a t-butoxycarbonyl group. In view of easiness in introduction and deprotection, the protective group is preferably a benzyl group, a trityl group, a formyl group, an acetyl group, a chloroacetyl group, a tetrachloroacetyl group, a tetrafluoroacetyl group, a benzoyl group, a phenylacetoxy group, a 9-fluorenylmethoxycarbonyl group, or a t-butoxycarbonyl group.

The following description explains an amino acid represented by the general formula (3):

Chem. 16

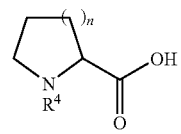

(3)

and an amino acid represented by the general formula (4):

Chem. 17

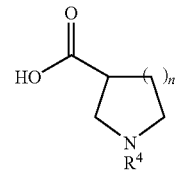

(4)

In the general formulas (3) and (4), n is an integer of 1 to 5, and is not particularly limited. However, in view of availability, proline, pipecolic acid, or nipecotic acid is preferable as the amino acid. $R^2$ is as explained before.

The amino acids other than glycine have an asymmetric carbon; these may be an optically active substance or a racemic body.

Examples of a cation component of the ionic liquid encompass: ammonium and its derivative, imidazolinium and its derivative, pyridinium and its derivative, pyrrolidinium and its derivative, pyrrolinium and its derivative, pyrazinium and its derivative, pyrimidinium and its derivative, triazonium and its derivative, triazinium and its derivative, triazine and its derivative, quinolinium and its derivative, isoquinolinium and its derivative, indolinium and its derivative, quinoxalinium and its derivative, piperazinium and its derivative, oxazolinium and its derivative, thiazolinium and its derivative, morpholinium and its derivative, and piperazine and its derivative. Since the ionic liquid obtained from the amino acid shows a relatively low Tg, the cation component is preferably an imidazolium derivative. The imidazolium derivative is preferably diethyl imidazolium, ethyl butyl imidazolium, or dimethyl imidazolium, particularly preferably an ethyl methyl imidazolium or a methyl butyl imidazolium.

A used amount of ionic liquid is not particularly limited, however since the ionic liquid has ionic conductivity but no electron conductivity, the ionic liquid serves as an insulator in the capacitor electrolyte. Therefore, too much addition of the ionic liquid causes the impedance characteristics to deteriorate. Thus, a total amount of ionic liquid added is preferably not more than 1 molar equivalent with respect to the monomer component of a conductive polymer, and is further preferably not less than 0.01 molar equivalent but not more than 0.8 molar equivalent with respect to the monomer component of a conductive polymer. Furthermore, a molar ratio of the ionic liquid to the monomer component of a conductive polymer is not particularly limited as long as a good result is attained with the capacitor in impedance and withstand voltage characteristics. However, the ratio is preferably:

monomer component of a conductive polymer:ionic liquid=1:0.01 to 0.6 (molar ratio).

The ionic liquid of 0.01 or more attains an excellent withstand voltage, and the ionic liquid of 0.6 or less attains an excellent low-resistance. That is to say, a ratio of the ionic liquid to the monomer component of a conductive polymer is preferably not less than 0.01 in view of the withstand voltage and is preferably not more than 0.60 in view of low-resistance. If the ratio is lower than this range, an effect attained decreases, and if the ratio is higher than this range, the resistance increases, which is not preferable. The ratio is particularly preferably in a range of not less than 0.01 but not more than 0.5.

In order to further accomplish the high voltage characteristic, an additive such as an ammonium salt, an amine salt, a quaternary ammonium salt, a tertiary amine and organic acid, or an imidazolium salt may be added in addition to the ionic liquid. These additives are added to the electrolyte composition by being dissolved into the ionic liquid. Since the ionic liquid practically does not evaporate, the additives always are present in a solution form. Thus, anodization ability of the additives works positively to the anodization ability of the ionic liquid, thereby causing improvement in ability as an electrolyte. Examples of the ammonium salt encompass: ammonium adipate, ammonium borate, ammonium phosphate, ammonium adipate, and ammonium maleate. An example of the amine salt is triethylamine maleate, and examples of the quaternary ammonium salt are quaternary ammonium maleate and quaternary ammonium phthalate. The tertiary amine and organic acid may be, for example, combinations of (i) tertiary amines such as triethylamine and diisopropylethylamine and (ii) adipic acid, phosphoric acid, boric acid, salicylic acid, malic acid, succinic acid, or like acid. Examples of the imidazolium salt encompass: 1,3-ethylmethylimidazolium-p-toluenesulfonate, 1,3-butylmethylimidazolium-p-toluene sulfonate, 1,3-ethylmethylimidazolium-p-trifluoromethylphenylsulfonate, and 1,3-butylmethylimidazolium-p-trifluoromethylphenylsulfonate. Particularly, it was found by the inventors of the present invention that the imidazolium salts not only improve the anodization ability of the electrolyte but also improves ESR characteristics of the capacitor. Thus, the imidazolium salts are the additives that are preferably used.

An added amount of the additives are arbitrary selectable in a range in which properties of the ionic liquid as a liquid is not lost. For example, in a case where the ammonium adipate is added to the ionic liquid, although dependent on the type of the ionic liquid, it is generally preferable that in order to improve the anodization ability, an amount in a range of not less than 1 wt % to not more than 50 wt % is added. The additives may be used solely, or two or more of the additives may be used in combination in an arbitrary proportion.

The following description explains a method for manufacturing the conductive polymer capacitor. The method for manufacturing a conductive polymer capacitor including the electrolyte of the present invention and an electrode is not particularly limited. For example, the conductive polymer capacitor may be a capacitor element in a rolled-type conductive polymer aluminum electrolytic capacitor constructed by: forming on its surface a dielectric oxide film on an anode film made of a valve-acting metal, layering the anode film and a cathode film so as to sandwich a separator therebetween, and then rolling up the layered film. An electrolyte made of a conductive polymer and an ionic liquid is provided between the anode film and cathode film. An aluminum electrolytic capacitor is constructed by storing the element in, for example, a cylindrical aluminum case having a bottom, and sealing an opening of the aluminum case with a sealing agent.

In the present invention, an electrolyte may be produced by chemical polymerization or by electrolytic polymerization.

First described is the method by chemical polymerization. The chemical polymerization method is a method for polymerizing a monomer component of conductive polymer such as pyrrole in the presence of an appropriate oxidizing agent, so as to synthesize the electrolyte.

As the oxidizing agent, for example a ferric p-toluenesulfate, a ferric naphthalenesulfate, a ferric n-butylnaphthalene sulfate, a ferric triisopropylnaphthalenesulfate, a persulfate, a hydrogen peroxide, a diazonium salt, a halogen and halide, or salts of transition metals such as Fe, Cu, and Mn are usable. With a conductive polymer synthesized by chemical polymerization, a polymer having conductivity is attained in a one-step reaction by having the anion of the oxidizing agent introduced into a polymer in the polymerization process as a dopant. Thus, it is preferable to use as a dopant the ferric p-toluenesulfonate which includes a p-toluenesulfonate ion that has high mobility.

In the case of the chemical polymerization, it is preferable to add the oxidizing agent in a solution that includes the monomer component of conductive polymer and the ionic liquid. In this case, a solvent may be added to adjust viscosity and concentration of the liquid. The solvent used in the polymerization is not particularly limited, and a known polymerization solvent is used. For example, usable solvents encompass: methanol, ethanol, butanol, diethylene glycol, 2-propanol, acetone, diethyl ether, ethyl acetate, THF, DMF, acetonitrile, DMSO, dimethyl carbonate, ethylene carbonate, propylene carbonate, hexane, toluene, and chloroform. In view of compatibility with the ionic liquid and the monomer molecules of conductive polymer, butanol is particularly preferably used.

In this polymerization, a surface active agent for example may be included as an arbitrary component. Examples of the surface active agent encompass: linear sodium alkylbenzene sulfonate, tetraalkylammonium, sodium lauryl sulfate, triisopropylnaphthalenesulfonic acid, alkyl sulfonic acid, dodecylbenzenesulfonic acid, and hexadodecyltrimethylammonium bromide; it is particularly preferable to use dodecylbenzenesulfonic acid.

A known polymerization condition is sufficient as a condition for the polymerization, and a temperature range is from −50° C. to 200° C., particularly preferably in a range from 0° C. to 180° C.

The polymerization is carried out for 1 minute to 24 hours, particularly preferably for 1 minute to 5 hours. Moreover, this polymerization may be repetitively carried out a plurality of times.

The following description deals with a method for forming an electrolyte by electrolytic polymerization. The electrolytic polymerization method is a method in which a monomer component of conductive polymer is dissolved in a solvent, and dehydrogenation polymerization is carried out to the conductive polymer by anodization. The electrolytic polymerization separates out on the anode a polypyrrole that is a conductive polymer, by for example a method in which pyrrole monomers is dissolved in a solvent together with a supporting electrolyte, and thereafter dehydrogenation polymerization is carried out by anodization. Generally, an oxidation-reduction potential of a polymer is lower than that of a monomer, therefore oxidation of a polymer skeleton further proceeds in the polymerization process, and an anion of the supporting electrolyte is introduced into the polymer as a dopant together with the oxidation of the polymer skeleton. The electrolyte polymerization, with such a mechanism, has an advantage that a polymer having conductivity is attainable even if a dopant is not added at a later stage. Moreover, if the electrolyte polymerization is carried out inside the ionic liquid, there is a possibility that the anion component of the ionic liquid is introduced into the conductive polymer as a dopant. This is particularly preferable for attaining the object of the present invention. Since the oxide film on the valve metal is dielectric, in a case where the conductive polymer is synthesized by the electrolyte polymerization method, a conductive film is formed in advance on the dielectric film to make it conductive. Thereafter, electric current or voltage is applied from a power supply, to carry out the electrolytic polymerization. As the conductive film used for such a purpose, a conductive polymer synthesized by chemical polymerization, pyrolytic manganese dioxide or the like may be used.

A conventionally known anode for a capacitor is preferably used as the anode of the conductive polymer capacitor of the present invention. For example, (i) an anode metal for example an electrode foil made of aluminum or the like on which its surface is etched to form an etched hole or a powder electrode made of tantalum or the like, and (ii) a dielectric body made of an oxide film that is formed by anodizing a surface of the anode metal are combined, so as to form an anode made of an anode metal and a dielectric oxide film. The anodization is carried out by, for example, immersing the anode metal in an ammonium adipate aqueous solution or the like and applying a formation voltage to the anode metal.

As the cathode, a carbon paste and silver paste or the like may be formed by a conventionally known method. The anode and cathode are each connected to terminals. As such, a conductive polymer capacitor is formed which at least includes an anode, an electrolyte, and a cathode.

Constitutional features of the capacitor that are not particularly mentioned in the conductive polymer capacitor of the present invention using the electrolyte formed by the foregoing method are not particularly limited, and conventionally known components are used as appropriate.

EXAMPLES

The following description more specifically explains the present invention by use of Examples. However, the present invention is not limited to the Examples whatsoever, and may be modified as appropriate within the range in which its essential points are unchanged.

(Ionic Liquid)

An ionic liquid in which an amino acid serves as an anion component was all prepared based on the method disclosed in (Non Patent Literature 1). More specifically, usually, the ionic liquid may be prepared by an exchange reaction of salt of (i) an amino acid with (ii) an imidazolium cation having a hydroxyl group anion. An ionic liquid A and an ionic liquid B were prepared based on the method disclosed in (Patent Literature 4). More specifically, usually, the ionic liquids may be prepared by an exchange reaction of salt of (i) an imidazolium having a halogen anion with (ii) an ammonium salt of an equivalent fluoroalkylsulfuric acid. Other synthesis methods or source of supply of ionic liquids and salts are as follows:
(Non Patent Literature 1) J. Am. Chem. Soc. 2005, 127, 2398
(Patent Literature 4) International Patent Application Publication No. WO 2005/105756 pamphlet 1-butyl-3-methylimidazolium bis(perfluoromethylsulfonyl)imide (hereinafter referred to as [bmim][TFSI])

Chem. 18

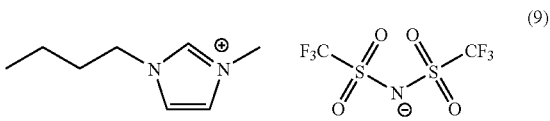

(9)

purchased from Kanto Chemical Co., Inc.

1-butyl-3-methylimidazolium trifluoromethanesulfoate (hereinafter referred to as [emim][TfO])

Chem. 19

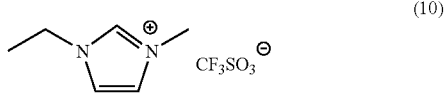

(10)

purchased from Wako Pure Chemical Industries Ltd.

1-butyl-3-methylimidazolium tetrafluoroborate
thereinafter referred to as [bmim][BF])

Chem. 20

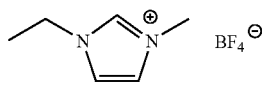
(11)

purchased from Merck.

1-butyl-3-methylimidazolium acetate (hereinafter
referred, to as [bmim][AcO])

Chem. 21

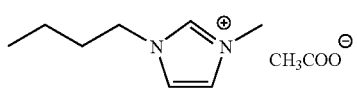
(12)

purchased from Aldrich.

1-butyl-3-methylimidazolium trifluoroacetate
(hereinafter referred to as [bmim][TFA])

Chem. 22

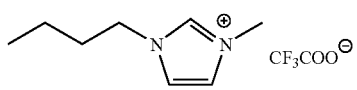
(13)

purchased from Merck.

1-ethyl-3-methylimidazolium lactate (hereinafter
referred to as [bmim][TFA])

Chem. 23

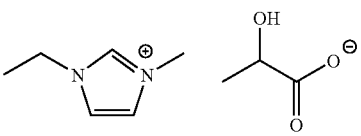
(14)

purchased from Aldrich.

1-butyl-3-methylimidazolium benzoate (hereinafter
referred to as [bmim][BA])

Chem. 24

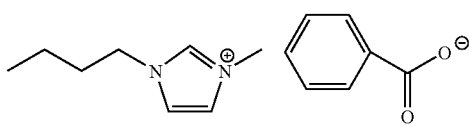
(15)

An aqueous solution (1-butyl-3-methylimidazolium hydrogen carbonate 50% aqueous solution (400 mg, 9.98 mmol)) was added and was cooled to 0° C. Thereafter, an aqueous solution of benzoic acid (1219 mg, 9.98 mmol) was slowly dropped therein, and this mixture was stirred at room temperature for 1 hour. A reaction solution was concentrated and a solvent was distilled under reduced pressure; dichloromethane was added to an obtained residue and an obtained organic layer was dried with anhydrous sodium sulfate. By distilling the solvent under reduced pressure, 1824.2 mg of an object compound was obtained as a light brown oily matter. (70% yield)

$^1$H NMR (CDCl$_3$, 300 MHz) δ 0.90 (t, 3H), 1.28-1.35 (m, 2H), 1.76-1.87 (m, 2H), 4.06 (s, 3H), 4.27 (t, 2H), 7.14 (d, 2H), 7.27-7.34 (m, 3H), 8.07-8.10 (m, 2H), 11.39 (s, 1H)

1-butyl-3-methylimidazolium mandelate (hereinafter
referred to as [bmim][MA])

Chem. 25

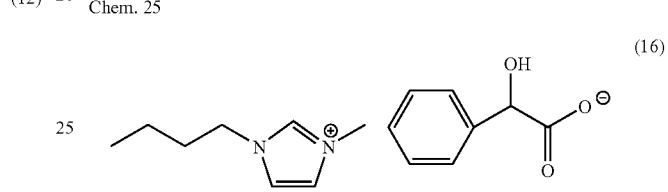
(16)

An aqueous solution (1-butyl-3-methylimidazolium hydrogen carbonate 50% aqueous solution (500 mg, 12.48 mmol)) was added and was cooled to 0° C. Thereafter, an aqueous solution of mandelic acid (1899 mg, 12.48 mmol) was slowly dropped therein, and this mixture was stirred at room temperature for 1 hour. A reaction solution was concentrated and a solvent was distilled under reduced pressure; dichloromethane was added to an obtained residue, and an obtained organic layer was dried with anhydrous sodium sulfate. By distilling the solvent under reduced pressure, 3622.3 mg of an object compound was obtained as a light brown oily matter. (100% yield)

$^1$H NMR (CDCl$_3$, 300 MHz) δ 0.93 (t, 3H), 1.29-1.34 (m, 2H), 1.74-1.79 (m, 2H), 3.84 (s, 3H), 4.10 (t, 2H), 4.92 (s, 1H), 7.04 (s, 1H), 7.14-7.26 (m, 1H), 7.23-7.26 (m, 3H), 7.54 (d, 2H), 10.74 (s, 1H)

1-buthyl-3-methylimidazolium caprylate (hereinafter
referred to as [bmim][CA])

Chem. 26

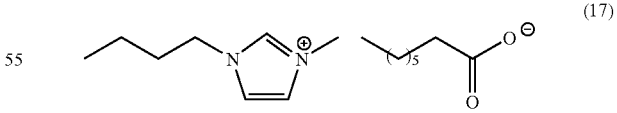
(17)

An aqueous solution (1-butyl-3-methylimidazolium hydrogen carbonate 50% aqueous solution (5.00 g, 12.48 mmol)) was added and was cooled to 0° C. Thereafter, an aqueous solution of caprylic acid (1.80 g, 12.48 mmol) was slowly dropped therein, and this mixture was stirred at room temperature for 1 hour. A reaction solution was concentrated and a solvent was distilled under reduced pressure; dichloromethane was added to an obtained residue, and an obtained organic layer was dried with anhydrous sodium sulfate. By distilling the solvent under reduced pressure, 2.20 g of an object compound was obtained as a yellow oily matter. (62% yield)

$^1$H NMR (CDCl$_3$, 300 MHz) δ 0.83-0.92 (m, 7H), 1.21-1.29 (m, 11H), 1.38 (m, 2H), 1.73-1.78 (m, 2H), 3.85 (s, 3H), 4.17 (t, 2H), 7.72 (s, 1H), 7.79 (s, 1H), 9.39 (s, 1H)

1-butyl-3-methylimidazolium phenylacetate (hereinafter referred to as [bmim][PA])

Chem. 27

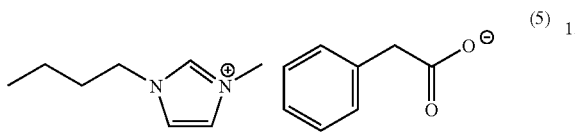

(5)

Amberlite IRA400 (OH) (140 mL) was poured into a chromatographic column tube, and 1N NaOH aqueous solution (2.5 L) was poured therein to activate the Amberlite IRA400 (OH). Thereafter, pure water (1.5 L) was poured into the tube until a filtrate became neutral. Pure water (50 mL) was added to 1-butyl-3-methylimidazolium chloride (5.0 g, 28.63 mmol) to melt the 1-butyl-3-methylimidazolium chloride, and this mixture was poured into the activated Amberlite IRA400 (OH), to obtain a 1-butyl-3-methylimidazolium hydroxide aqueous solution. Pure water (200 mL) and THF (100 mL) was added to phenylacetate (3.9 g, 28.63 mmol) and was made into an even solution. Into this solution, the 1-butyl-3-methylimidazolium hydroxide aqueous solution was slowly dropped, and the mixture was stirred at 0° C. for 12 hours. A reaction solution was concentrated; acetonitrile (90 mL) and methanol (10 mL) were added to an obtained residue, and the mixture was stirred at 0° C. for 30 minutes. A filtrate was concentrated, and was dried by heat under reduced pressure to obtain 8.0 g of an object compound as a light yellow oily matter. (100% yield)

$^1$H NMR (DMSO-d$^6$, 300 MHz) δ 0.89 (t, 3H), 1.21-1.28 (m, 2H), 1.70-1.77 (m, 2H), 3.23 (s, 2H), 3.83 (s, 3H), 4.15 (t, 2H), 7.09-7.19 (m, 5H), 7.70 (s, 1H), 7.77 (s, 1H), 9.29 (s, 1H)

1-butyl-3-methylimidazolium 2-phenylbutylate thereinafter referred to as [bmim][PB])

Chem. 28

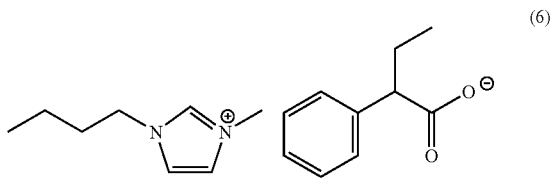

(6)

An aqueous solution (1-butyl-3-methylimidazolium hydrogen carbonate 50% aqueous solution (6.0 g, 14.98 mmol)) was added and was cooled to 0° C. Thereafter, an aqueous solution of 2-phenylbutyric acid (2.4 g, 14.98 mmol) was slowly dropped therein, and this mixture was stirred at room temperature for 1 hour. A reaction solution was concentrated and a solvent was distilled under reduced pressure; dichloromethane was added to an obtained residue, and an obtained organic layer was dried with anhydrous sodium sulfate. By distilling the solvent under reduced pressure, 4.5 g of an object compound was obtained as a yellow oily matter. (100% yield)

$^1$H NMR (DMSO-d$^6$, 300 MHz) δ 0.66 (t, 3H), 0.80 (t, 3H), 1.12-1.19 (m, 1H), 1.31-1.35 (m, 1H), 1.61-1.80 (m, 3H), 2.82 (t, 1H), 3.74 (s, 3H), 4.06 (t, 2H), 6.95-7.15 (m, 5H), 7.62 (d, 1H), 7.68 (d, 1H), 9.28 (s, 1H)

1-butyl-3-methylimidazolium 3-phenylpropionate thereinafter referred to as [bmim][PP])

Chem. 29

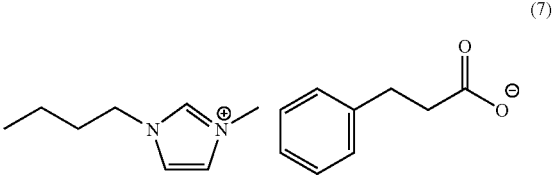

(7)

An aqueous solution (1-butyl-3-methylimidazolium hydrogen carbonate 50% aqueous solution (6.0 g, 14.98 mmol)) was added and was cooled to 0° C. Thereafter, an aqueous solution of 4-phenylacetic acid (2.4 g, 14.98 mmol) was slowly dropped therein, and this mixture was stirred at room temperature for 1 hour. A reaction solution was concentrated and a solvent was distilled under reduced pressure; dichloromethane was added to an obtained residue, and an obtained organic layer was dried with anhydrous sodium sulfate. By distilling the solvent under reduced pressure, 4.4 g of an object compound was obtained as a yellow oily matter. (98% yield)

$^1$H NMR (CDCl$_3$, 300 MHz) δ 0.94 (t, 3H), 1.32-1.39 (m, 2H), 1.82-1.87 (m, 2H), 1.95-2.01 (m, 2H), 2.30 (t, 2H), 2.68 (t, 2H), 4.06 (s, 3H), 4.29 (t, 2H), 7.07-7.27 (m, 7H), 11.68 (s, 1H)

1-butyl-3-methylimidazolium naphthylacetate (hereinafter referred to as [bmim][NA])

Chem. 30

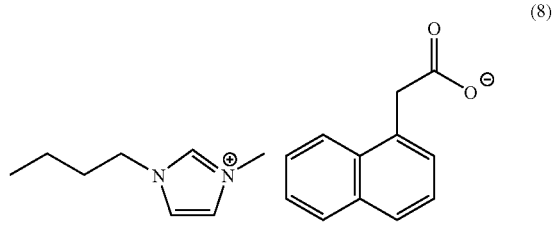

(8)

An aqueous solution (1-butyl-3-methylimidazolium hydrogen carbonate 50% aqueous solution (6.0 g, 14.98 mmol)) was added and was cooled to 0° C. Thereafter, an aqueous solution of 1-naphthaleneacetic acid (2.7 g, 14.98 mmol) was slowly dropped therein, and this mixture was stirred at room temperature for 1 hour. A reaction solution was concentrated and the solvent was distilled under reduced pressure; dichloromethane was added to an obtained residue, and an obtained organic layer was dried with anhydrous sodium sulfate. By distilling the solvent under reduced pressure, 5.0 g of an object compound was obtained as a yellow oily matter. (100% yield)

$^1$H NMR (DMSO-d$^6$, 300 MHz) δ 0.88 (t, 3H), 1.19-1.26 (m, 2H), 1.70-1.75 (m, 2H), 3.59 (s, 2H), 3.81 (s, 3H), 4.12 (t, 2H), 7.22-7.44 (m, 4H), 7.64-7.76 (m, 3H), 7.80-7.83 (m, 1H), 8.15-8.18 (m, 1H), 9.36 (s, 1H)

1-ethyl-3-methylimidazolium tosylate (hereinafter referred to as [emim][TsO])

Chem. 31

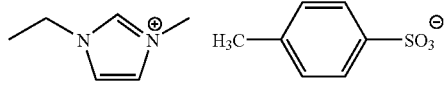

(18)

purchased from Aldrich.

1-ethyl-3-methylimidazolium 4-(trifluoromethyl)benzenesulfonate (hereinafter referred to as [emim][TFBSA])

Chem. 32

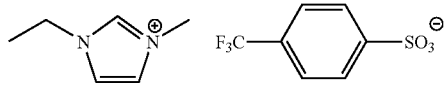

(19)

Ethyl 4-(trifluoromethyl)benzenesulfonate (2000 mg, 7.86 mmol), 1-methylimidazole (645 mg, 7.86 mmol), and 1,1,1-trichloroethane (8.0 mL) were added consecutively in a reaction container, and this mixture was heated to reflux for 8 hours. After a reaction solution was concentrated, an obtained solid was washed with 1,1,1-trichloroethane. Thereafter, dichloromethane (6.0 mL) was added thereto, and this mixture was washed with water (3.0 mL) three times. An organic layer was then dried with anhydrous sodium sulfate. By distilling the solvent under reduced pressure, 2321.9 mg of an object compound was obtained as a white solid. (88% yield)

$^1$H NMR (CDCl$_3$, 300 MHz) δ 1.53 (t, 3H), 4.02 (s, 3H), 4.29 (q, 2H), 7.30 (brs, 2H), 7.63 (d, 2H), 8.02 (d, 2H), 9.80 (s, 1H)

The ethyl 4-(trifluoromethyl)benzenesulfonate used was synthesized by the following method.

An ethanol/dichloromethane solution (703 mg, 15.27 mmol/5.0 mL) was poured into a reaction container, and was reduced in temperature to 0° C. Thereafter, triethylamine (2317 mg, 22.90 mmol), 4-(trifluoromethyl)benzenesulfonyl chloride/dichloromethane solution (3736 mg, 15.27 mmol/10 mL) was dropped in the reaction container consecutively. After stirring this mixture at room temperature for 1 hour, ice water was added to the mixture to terminate the reaction. After extraction with dichloromethane, the mixture was washed with water and with saturated saline, and an obtained organic layer was dried with anhydrous sodium sulfate. A solvent was distilled under reduced pressure, and an obtained residue was purified by silica gel column chromatography (hexane/ethyl acetate=5/1, silica gel 30 g), thereby obtaining 3299.0 mg of an object compound as a colorless, transparent oily matter. (85% yield)

$^1$H NMR (CDCl$_3$, 300 MHz) δ 1.34 (t, 3H), 4.19 (q, 2H), 7.83 (d, 2H), 8.05 (d, 2H)

1-butyl-3-methylimidazolium 4-(trifluoromethyl)benzenesulfonate (hereinafter referred to as [bmim][TFBSA]

Chem. 33

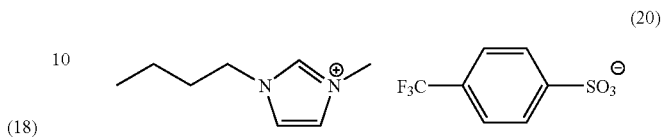

(20)

Butyl 4-(trifluoromethyl)benzenesulfonate (500 mg, 1.77 mmol), 1-methylimidazole (145 mg, 1.77 mmol), and 1,1,1-trichloroethane (1.8 mL) were added consecutively in a reaction container, and this mixture was heated to reflux for 6 hours. After a reaction solution was concentrated, an obtained solid was washed with 1,1,1-trichloroethane. Thereafter, dichloromethane (3.0 mL) was added, and this mixture was washed with water (2.0 mL) three times. An organic layer was then dried with anhydrous sodium sulfate. By distilling the solvent under reduced pressure, 660.4 mg of an object compound was obtained as a light brown solid. (100% yield)

$^1$H NMR (CDCl$_3$, 300 MHz) δ 0.92 (t, 3H), 1.29-1.36 (m, 2H), 1.78-1.88 (m, 2H), 4.04 (s, 3H), 4.23 (t, 2H), 7.23 (s, 1H), 7.30 (s, 1H), 7.63 (d, 2H), 8.03 (d, 2H), 9.85 (s, 1H)

The butyl 4-(trifluoromethyl)benzenesulfonate used was synthesized by the following method.

A butanol/dichloromethane solution (302 mg, 4.08 mmol/1.0 mL) was poured into a reaction container, and was reduced in temperature to 0° C. Thereafter, triethylamine (620 mg, 6.13 mmol) and 4-(trifluoromethyl)benzenesulfonyl chloride/dichloromethane solution (1000 mg, 4.08 mmol/3.0 mL) were dropped in the reaction container consecutively. After stirring this mixture at room temperature for 1 hour, ice water was added to the mixture to terminate the reaction. After extraction with dichloromethane, the mixture was washed with water and with saturated saline, and an obtained organic layer was dried with anhydrous sodium sulfate. A solvent was distilled under reduced pressure, and an obtained residue was purified by silica gel column chromatography (hexane/ethyl acetate=5/1, silica gel 10 g), thereby obtaining 992.5 mg of an object compound as a colorless, transparent oily matter. (84% yield)

$^1$H NMR (CDCl$_3$, 300 MHz) δ 0.88 (t, 3H), 1.32-1.39 (m, 2H), 1.61-1.71 (m, 2H), 4.11 (t, 2H), 7.83 (d, 2H), 8.05 (d, 2H)

Impedance Measurement

Impedance was measured by use of a mercury cell illustrated in FIG. 1. An LCR meter 3522-50 manufactured by HIOKI E.E. Corporation was used as a measuring device to measure the impedance, and an impedance value of 100 kHz was interpreted as an impedance of the electrode.

Example 1

A conductive polymer aluminum electrolytic capacitor was produced by forming a conductive polymer on an aluminum oxide film, which conductive polymer was formed by chemically polymerizing 3,4-ethylenedioxythiophene (hereinafter referred to as EDOT; manufactured by H.C. Starck-V TECH). Namely, an aluminum etched foil having an effective area of 10 mm×10 mm was immersed in 1% ammonium adipate aqueous solution, and a voltage applied was raised from 0 V to 45 V at a rate of 20 mV/sec. Subsequently, a constant voltage of 45 V was applied to the foil for 40 minutes, in order to form a dielectric film on a surface of the aluminum etched foil. Next, this foil was washed for 3 minutes with flowing deionized water, and then the foil was dried at 120° C. for 1 hour. A content of the aluminum etched foil in the liquid at this time was 25 µF. Next, EDOT and an ionic liquid [emim][LA] that constitutes ethylmethylimidazolium cation and lactic acid were blended so as to have a molar ratio of 1:0.5, thereby preparing a chemical polymerization composition to be used for electrolyte formation. A 40 wt % 1-butanol solution of iron p-toluenesulfonate was used as an oxidizing agent, and to the composition including the EDOT/ [emim] [LA], the iron p-toluenesulfonate of an amount of 0.5 molar equivalent with respect to the EDOT was added. The aluminum etched foil was then immersed into this polymerization solution, was taken out and heated to reflux at 120° C. for 1 hour. The same process was repeated 4 times, so that the surface of the foil was evenly covered with the electrolyte. Impedance of the foil obtained as such was measured by use of the mercury cell illustrated in FIG. 1. Furthermore, the electrode thus obtained was stored in an oven at 105° C. for 650 hours and thereafter impedance was measured by the same method, to observe a degree of decrease in impedance characteristics from the initial value. Results of the measurement are as shown in Table 1. The results in Table 1 are an average value of 10 electrodes, and show a value of impedance at 10 kHz. The degree of decrease in characteristic was calculated as (impedance after 650 hours)/(initial impedance) %.

Examples 2 to 10

Capacitors were produced as similar to Example (Ex.) 1 except that the ionic liquids were changed to respective ionic liquids shown in Table 1, and characteristics of the obtained capacitors were evaluated. Results obtained are as shown in Table 1. By comparing these results and results of Comparative Examples (C. Ex.) 1 to 5 as shown in Table 3, it was confirmed that ionic liquids that had a carboxylic acid as its anion component attained a conductive polymer capacitor electrolyte that has excellent durability.

Examples 11 to 13

Capacitors were produced as similar to Example 1 except that (i) the ionic liquid was [emim][LA], (ii) a respective salt shown in Table 1 was included so that a ratio of EDOT:[emim] [LA]: salt was 1:0.25:0.25 (molar ratio), and (iii) a chemical polymerization composition to be used for electrolyte formation was prepared, and characteristics of the obtained capacitors were evaluated. Results obtained are as shown in Table 1.

TABLE 1

| | | | Impedance (Ω@10 kHz) | | |
| | | | Initial (Ω@10 kHz) | After 650 h (Ω@10 kHz) | Increase rate (%) |
| ILs | salt | | | | |
| --- | --- | --- | --- | --- | --- |
| Ex. 1 | [emim][LA] | — | 1.4 | 4.3 | 307.1 |
| Ex. 2 | [bmim][TFA] | — | 1.1 | 3.8 | 345.5 |
| Ex. 3 | [bmim][AcO] | — | 1.5 | 5.0 | 333.3 |
| Ex. 4 | [bmim][BA] | — | 1.4 | 4.8 | 342.9 |
| Ex. 5 | [bmim][MA] | — | 1.2 | 3.4 | 283.3 |
| Ex. 6 | [bmim][CA] | — | 2.0 | 6.1 | 305.0 |
| Ex. 7 | [bmim][PA] | — | 1.6 | 5.5 | 343.8 |
| Ex. 8 | [bmim][PB] | — | 1.2 | 4.2 | 350.0 |
| Ex. 9 | [bmim][PP] | — | 1.2 | 3.9 | 325.0 |
| Ex. 10 | [bmim][NA] | — | 1.1 | 3.2 | 290.9 |
| Ex. 11 | [emim][LA] | [emim][TsO] | 0.8 | 2.4 | 300.0 |
| Ex. 12 | [emim][LA] | [emim][TFBSA] | 0.9 | 2.8 | 306.7 |
| Ex. 13 | [emim][LA] | [emim][TFBSA] | 0.9 | 2.7 | 303.3 |

Examples 14 to 33

Capacitors were produced as similar to Example 1 except that the ionic liquid was changed to respective ionic liquids as shown in Table 1, and characteristics of the obtained capacitors were evaluated. Results obtained are as shown in Table 1. By comparing these results and the results of Comparative Examples 1 to 5 as shown in Table 3, it was confirmed that ionic liquids that had a carboxylic acid as its anion component attained a conductive polymer capacitor electrolyte that has excellent durability.

TABLE 2

| | Impedance (Ω@10 kHz) | | |
| ILs | Initial (Ω@10 kHz) | After 650 h (Ω@10 kHz) | Increase rate (%) |
| --- | --- | --- | --- |
| Ex. 14 | [emim][Gly] | 0.9 | 2.9 | 322.2 |
| Ex. 15 | [emim][Ala] | 1.2 | 4.0 | 333.3 |
| Ex. 16 | [emim][Phe] | 1.5 | 5.5 | 366.7 |
| Ex. 17 | [emim][Cys] | 1.4 | 4.8 | 342.9 |
| Ex. 18 | [emim][Leu] | 1.6 | 5.1 | 318.8 |
| Ex. 19 | [emim][Lys] | 2.0 | 7.3 | 365.0 |
| Ex. 20 | [emim][Met] | 1.9 | 7.1 | 373.7 |
| Ex. 21 | [emim][Pro] | 1.2 | 4.4 | 366.7 |
| Ex. 22 | [emim][Ser] | 0.8 | 2.9 | 362.5 |
| Ex. 23 | [emim][Thr] | 1.1 | 3.9 | 354.5 |
| Ex. 24 | [emim][Trp] | 1.8 | 6.0 | 333.3 |
| Ex. 25 | [emim][Tyr] | 3.2 | 11.5 | 359.4 |
| Ex. 26 | [emim][Val] | 1.1 | 3.7 | 336.4 |
| Ex. 27 | [emim][Arg] | 2.8 | 9.0 | 321.4 |
| Ex. 28 | [emim][Asn] | 2.2 | 8.2 | 372.7 |
| Ex. 29 | [emim][Asp] | 3.8 | 13.9 | 365.8 |
| Ex. 30 | [emim][Gln] | 3.6 | 12.9 | 358.3 |
| Ex. 31 | [emim][Glu] | 2.4 | 8.7 | 362.5 |
| Ex. 32 | [emim][His] | 2.8 | 10.0 | 357.1 |
| Ex. 33 | [emim][Ile] | 1.7 | 6.0 | 352.9 |

Comparative Examples 1 to 5

Capacitors were produced as similar to Example except that the ionic liquid was changed to respective ionic liquids as shown in Table 3, and characteristics of the obtained capacitors were evaluated. Results of the evaluation are as shown in Table 3.

TABLE 3

| ILs | Impedance (Ω @ 10 kHz) | | |
|---|---|---|---|
| | Initial (Ω @ 10 kHz) | After 650 h (Ω @ 10 kHz) | Increase rate (%) |
| C. Ex. 1 | [emim][TfO] | 4.0 | 30.9 | 772.5 |
| C. Ex. 2 | A | 1.6 | 9.6 | 600.0 |
| C. Ex. 3 | B | 1.2 | 4.5 | 375.0 |
| C. Ex. 4 | [emim][BF$_4$] | 7.4 | 237.3 | 3206.8 |
| C. Ex. 5 | [emim][TFSI] | 5.4 | 154.7 | 2864.8 |

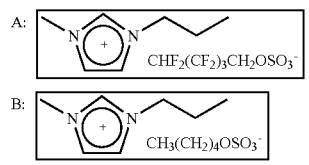

Example 34

Figure 2:
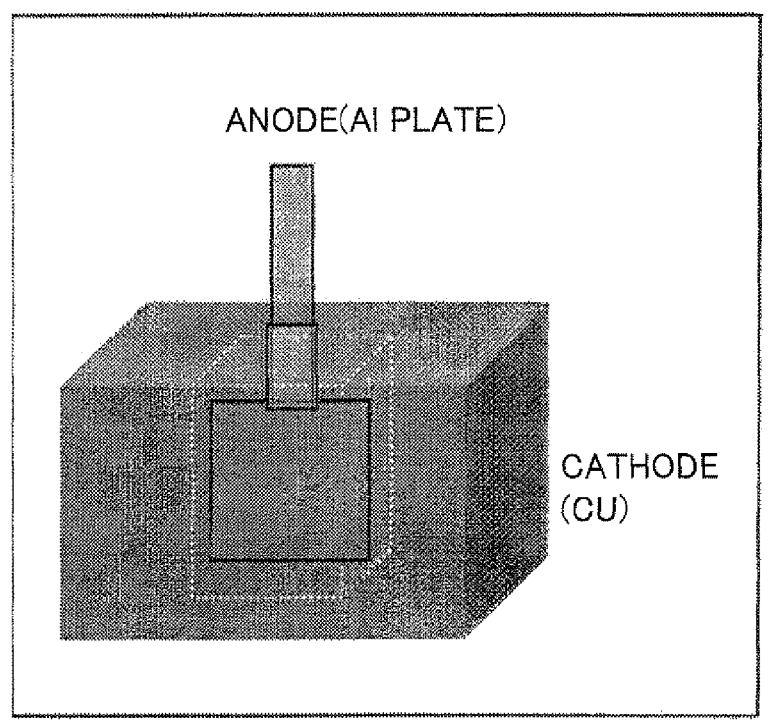
FIG. 2 illustrates a cell used for anodization of aluminum by an ionic liquid.

The following experiment was carried out as an evaluation of anodization ability. An aluminum plate processed to be a size of 10 mm×10 mm×0.5 mm was immersed in [emim][LA] with use of a measurement cell illustrated in FIG. 2. A voltage applied thereto was raised up to 40 V at a rate of 100 mV/sec, to form a film. After the film was formed, the film was washed and dried, thereby preparing an analysis sample. The obtained oxide film was analyzed by XPS. The XPS analysis used Quantum 2000 manufactured by ULVAC-PHI, Inc., and carried out a depth profile measurement by an argon ion etching method under a condition of: X-ray intensity of AlKα/15 kV, 12.5 W; X-ray beam diameter of 50 μmΦ; and sputter rate of 0.9 nm/min (SiO$_2$ conversion). In the obtained depth profile, a sputtering time in which both of Al$_{2P}$ data value and O$_{1S}$ data value changed by at least 5% after elapse of a stationary state for a predetermined time as compared to data thereof immediately before was defined as "a sputtering time equivalent to an oxide film thickness". Moreover, in data that used ammonium phosphate, a result of 0.4 nm/min that was observed as the thickness and sputtering time was used to calculate film thickness that uses the various ionic liquids.

Samples in the depth profile which showed no stationary state in the Al$_{2P}$ data and O$_{1S}$ data for a predetermined time were determined as not forming a clear oxide film, and no calculation of film thickness were carried out thereto. Results of the experiment are shown in Table 4.

Examples 35 to 43

Experiments were carried out as similar to Example 34 except that the ionic liquid was changed to respective ionic liquids shown in Table 4. Results of the experiments are as shown in Table 4.

Comparative Examples 7 to 9

Experiments were carried out as similar to Example 1 except that the ionic liquid was changed to respective ionic liquids shown in Table 4. Results of the experiments are as shown in Table 4.

Comparative Example 10

Oxide film analysis was made as similar to Example 1 except that the ionic liquid was [bmim][TFSI], and that the voltage was raised up to 10 V. It was observed that as a result, an oxide film having a thickness of 9.5 nm was formed.

The ionic liquids of Examples 34 to 43 observed a clear oxide film, however the ionic liquids of Comparative Examples 7 to 9 each could not observe an oxide film. From the above results, it was demonstrated that the ionic liquids shown in Examples 34 to 43 are ionic liquids that have excellent anodization ability as compared to the ionic liquids shown in Comparative Examples 7 to 9. Moreover, in Comparative Example 10, it was observed that an oxide film was formed in an area in which the voltage was low. The ionic liquid used in Comparative Example 10 was an ionic liquid reported as having anodization ability and that the ionic liquid contributes in enabling high withstand voltage in capacitors. However, no oxide film was observed in Comparative Example 7 in which the voltage applied was raised to 40 V. This is thought to be that the oxide film disappeared, since in a high voltage range, melting of the film was prioritized than formation of the film. With the ionic liquids shown in Examples 34 to 43, the melting of the film does not occur even in a high voltage range of 40 V. Thus, it was demonstrated that the ionic liquids have extremely excellent anodization abilities.

TABLE 4

| | Oxide Film Thickness (nm) | Ionic Liquid |
|---|---|---|
| Ex. 34 | 34.4 | [emim][LA] |
| Ex. 35 | 32.4 | [bmim][TFA] |
| Ex. 36 | 24.0 | [bmim][AcO] |
| Ex. 37 | 42.0 | [bmim][BA] |
| Ex. 38 | 40.0 | [bmim][MA] |
| Ex. 39 | 32.0 | [bmim][CA] |
| Ex. 40 | 38.2 | [bmim][PA] |
| Ex. 41 | 36.3 | [bmim][PB] |
| Ex. 42 | 37.6 | [bmim][PP] |
| Ex. 43 | 42.2 | [bmim][NA] |
| C. Ex. 7 | No clear oxide film observed | [bmim][TFSI] |
| C. Ex. 8 | No clear oxide film observed | [bmim[TFSA] |
| C. Ex. 9 | No clear oxide film observed | [emim][BF$_4$] |

The invention claimed is:

1. An electrolyte composition comprising:
a monomer component of a conductive polymer; and
at least one of (i) an ionic liquid including a formate anion, and/or (ii) an ionic liquid including an anion represented by the following general formula (1):

Chem. 1

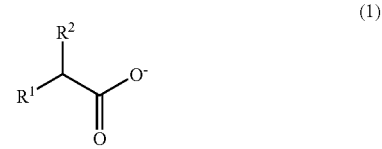

wherein R$^1$ and R$^2$ independently denote: a hydrogen atom, a protected or nonprotected hydroxyl group, a protected or nonprotected amino group, an alkoxy group, a nitro group, a cyano group, a carboxyl group, a halogen atom, a linear, branched, cyclic or acyclic, substituted or unsubstituted C$_1$ to C$_{20}$ alkyl group, a linear, branched, cyclic or acyclic, substituted or unsubstituted C$_2$ to C$_{20}$ alkenyl group, a linear, branched, cyclic or acyclic, substituted or unsubstituted C$_2$ to C$_{20}$ alkynyl group, a substituted or unsubstituted C$_6$ to C$_{20}$ aryl group, a substituted or unsubstituted C$_4$ to C$_{20}$ heteroaryl group, a substituted or unsubstituted C$_7$ to C$_{20}$ aralkyl group, or a substituted or unsubstituted C$_4$ to C$_{20}$ heteroaralkyl group; the $R^1$ and $R^2$ being identical to or different from each other, together being cyclic or acyclic; at least one of the $R^1$ and $R^2$ is a protected or nonprotected hydroxyl group; and (i) the ionic liquid including a formate anion and/or (ii) the ionic liquid including an anion represented by the general formula (1) being included by an amount of not less than 0.01 molar equivalent but not more than 0.5 molar equivalent, with respect to the monomer component of a conductive polymer.

2. The electrolyte composition according to claim 1, wherein:
in the general formula (1), one of the $R^1$ and $R^2$ is a protected or nonprotected hydroxyl group, and the other one of the $R^1$ and $R^2$ is a linear, branched, cyclic or acyclic, substituted or unsubstituted $C_1$ to $C_{20}$ alkyl group or a substituted or unsubstituted $C_6$ to $C_{20}$ aryl group.

3. The electrolyte composition according to claim 2, wherein:
the general formula (1) represents mandelic acid and its derivative.

4. The electrolyte composition according to claim 1, wherein:
the electrolyte composition includes:
the ionic liquid whose anion component is an amino acid or an amino acid derivative.

5. The electrolyte composition according to claim 1, wherein:
the ionic liquid has an ability to form, by anodization, an oxide film on a valve metal surface.

6. The electrolyte composition according to claim 1, wherein:
a cation component of the ionic liquid is selected from the group consisting of: ammonium ions, imidazolinium ions, pyridinium ions, pyrrolidinium ions, pyrrolinium ions, pyrazinium ions, pyrimidinium ions, triazonium ions, triazinium ions, triazine ions, quinolinium ions, isoquinolinium ions, indolinium ions, quinoxalinium ions, piperazinium ions, oxazolinium ions, thiazolinium ions, morpholinium ions, piperazine ions, imidazolium ions and their derivatives.

7. The electrolyte composition according to claim 1, wherein:
a monomer that constructs a conductive polymer includes at least one or two or more of compounds selected from the group consisting of: pyrrole, aniline, thiophene, and their derivatives.

8. An electrolyte composition comprising:
a monomer component of a conductive polymer;
at least one of (i) an ionic liquid including a formate anion, and/or (ii) an ionic liquid including an anion represented by the following general formula (1):

Chem. 1

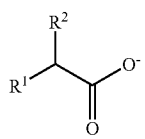

(1)

wherein $R^1$ and $R^2$ independently denote: a hydrogen atom, a protected or nonprotected hydroxyl group, a protected or nonprotected amino group, an alkoxy group, a nitro group, a cyano group, a carboxyl group, a halogen atom, a linear, branched, cyclic or acyclic, substituted or unsubstituted $C_1$ to $C_{20}$ alkyl group, a linear, branched, cyclic or acyclic, substituted or unsubstituted $C_2$ to $C_{20}$ alkenyl group, a linear, branched, cyclic or acyclic, substituted or unsubstituted $C_2$ to $C_{20}$ alkynyl group, a substituted or unsubstituted $C_6$ to $C_{20}$ aryl group, a substituted or unsubstituted $C_4$ to $C_{20}$ heteroaryl group, a substituted or unsubstituted $C_7$ to $C_2$ aralkyl group, or a substituted or unsubstituted $C_4$ to $C_{20}$ heteroaralkyl group; the $R^1$ and $R^2$ being identical to or different from each other, together being cyclic or acyclic; at least one of the $R^1$ and $R^2$ is a protected or nonprotected hydroxyl group; and
at least one substance selected from the group consisting of: ammonium salts, amine salts, quaternary ammonium salts, tertiary amines and organic acids, imidazolium salts, and amidine salts, the at least one substance being added to the ionic liquid and being included by an amount of not less than 1 wt % but not more than 50 wt %, with respect to the ionic liquid.

9. The electrolyte composition according to claim 8, wherein:
in the general formula (I), one of the $R^1$ and $R^2$ is a protected or nonprotected hydroxyl group, and the other one of the $R^1$ and $R^2$ is a linear, branched, cyclic or acyclic, substituted or unsubstituted $C_1$ to $C_{20}$ alkyl group or a substituted or unsubstituted $C_6$ to $C_{20}$ aryl group.

10. The electrolyte composition according to claim 9, wherein:
the general formula (I) represents mandelic acid and its derivative.

11. The electrolyte composition according to claim 8, wherein:
the electrolyte composition includes:
the ionic liquid whose anion component is an amino acid or an amino acid derivative.

12. The electrolyte composition according to claim 8, wherein:
the ionic liquid has an ability to form, by anodization, an oxide film on a valve metal surface.

13. The electrolyte composition according to claim 8, wherein:
a cation component of the ionic liquid is selected from the group consisting of: ammonium ions, imidazolinium ions, pyridinium ions, pyrrolidinium ions, pyrrolinium ions, pyrazinium ions, pyrimidinium ions, triazonium ions, triazinium ions, triazine ions, quinolinium ions, isoquinolinium ions, indolinium ions, quinoxalinium ions, piperazinium ions, oxazolinium ions, thiazolinium ions, morpholinium ions, piperazine ions, imidazolium ions and their derivatives.

14. The electrolyte composition according to claim 8, wherein:
a monomer that constructs a conductive polymer includes at least one or two or more of compounds selected from the group consisting of: pyrrole, aniline, thiophene, and their derivatives.

* * * * *

UNITED STATES PATENT AND TRADEMARK OFFICE
CERTIFICATE OF CORRECTION

PATENT NO. : 8,591,757 B2  Page 1 of 1
APPLICATION NO. : 12/675888
DATED : November 26, 2013
INVENTOR(S) : Ohishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Twenty-second Day of September, 2015

Michelle K. Lee
*Director of the United States Patent and Trademark Office*